United States Patent [19]
Hayner

[11] Patent Number: 6,153,004
[45] Date of Patent: Nov. 28, 2000

[54] SAFE SULFUR SLURRY

[75] Inventor: Roger E. Hayner, Hebron, Ky.

[73] Assignee: Marathon Ashland Petroleum LLC

[21] Appl. No.: 09/465,389

[22] Filed: Dec. 17, 1999

Related U.S. Application Data

[60] Provisional application No. 60/137,348, Jun. 3, 1999.

[51] Int. Cl.$^7$ .................................................. C09D 195/00
[52] U.S. Cl. ........................................... 106/274; 106/275
[58] Field of Search ...................................... 106/274, 275

[56] References Cited

U.S. PATENT DOCUMENTS

| | | | |
|---|---|---|---|
| 4,211,575 | 7/1980 | Burris ....................................... | 106/274 |
| 4,283,231 | 8/1981 | Clementoni et al. .................... | 106/274 |
| 5,961,709 | 10/1999 | Hayner et al. .......................... | 106/280 |
| 6,001,162 | 12/1999 | Hayner et al. .......................... | 106/274 |

*Primary Examiner*—David Brunsman
*Attorney, Agent, or Firm*—Richard D. Stone

[57] ABSTRACT

A sulfur in oil in asphalt blend is disclosed. A polymer-free slurry of solid, elemental, sulfur in liquid oil is used to add sulfur to asphalt. Addition of a slurry of solid sulfur in oil, or oil containing sulfur compounds, permits rapid and effective dispersion of the sulfur component in the asphalt. Uneven mixing, which can occur when sulfur is separately added as a solid, or in molten forms to the asphalt, is avoided. The method is safer because formation of explosive clouds of sulfur dust is avoided.

13 Claims, No Drawings

SAFE SULFUR SLURRY

This application claims the benefit under 35 U.S.C. 120 of prior co-pending, provisional application 60/137,348, filed on Jun. 3, 1999.

BACKGROUND OF THE INVENTION

I. Field of the Invention

The invention relates to asphalt compositions containing asphalt and sulfur.

II. Description of the Prior Art

Road building has been a source of inspiration and aggravation for civilization for millennia. Ancient Rome built roads that would last for centuries, but which required an enormous investment in labor and materials and a high level of sophistication. In the 1830's, travelers prized the opportunity to travel on short stretches of macadam roads made of three layers of graded stone, the top layer of which contained some bituminous or asphaltic binder.

The need to reduce costs and use locally available materials led to wooden plank roads, which were, in turn, replaced with asphalt roads. By the early 20$^{th}$ century, asphalt roads, mixtures of gravel and asphaltic petroleum fractions, were the dominant roads. Many times an asphalt gravel mix was simply poured on a minimally prepared surface. Such roads could be built cheaply and quickly with unsophisticated labor, but deteriorated rapidly.

Roman roads lasted for centuries, but took decades to build. Macadam roads, built according to the original rigid specifications of 1830, lasted for decades, but took months or years to build. Many asphalt roads were built in weeks or months only to deteriorate after a few years. Asphalt roads that deteriorate rapidly do so because of lack of surface preparation and drainage, poor construction practices and poor quality materials.

Asphalt roads have come full circle. The early macadam roads were prized for their quality and durability. Many modern macadam roads suffer a largely undeserved poor reputation for quality.

There is a renewed interest in building quality roads with asphalt as civil engineers and municipalities realize that better asphalt roads are possible by using better surface preparation, construction practices; and better asphalts.

Some improvements in asphalt properties were achieved by selecting the starting crude petroleum, or control of the refinery processing steps used to make the asphalt Unfortunately, there are many crudes which do not make good asphalts. There are only a limited number of steps which can be taken to control the refining process to make better asphalt.

The next step taken by the industry was to modify the asphalt. Air blowing makes asphalts harder. Fluxing agents or diluent oils are sometimes used to soften the asphalt.

Marked changes in asphalt properties can be achieved with sulfur, either added to neat asphalt or when added as a cross-linking agent to treat a mixture of asphalt and polymer.

The conventional methods of adding sulfur (dumping loose powder or bags of powdered sulfur on top of molten asphalt in a mix tank) had some problems. Of significant concern is safety. There exists the potential for fire and explosion hazards, caused by having a potentially large cloud of hot and flammable sulfur dust. Sulfur dust is by its very nature considered explosive.

It was also difficult in a commercial facility to rapidly and completely mix powdered sulfur with asphalt. Some parts of the asphalt saw too much sulfur too rapidly while other parts of the blend were sulfur deficient. Such an approach, led to over cross-linking parts of the blend, forming lumps of super-vulcanized materials which were not compatible with the rest of the blend.

Some work has been conducted on adding molten sulfur and mixing the liquid sulfur with liquid asphalt. A somewhat similar approach was forming a "mother liquor", or blend of sulfur, oil, and polymer, and adding this to the asphalt and then mixing. These approaches can help, but were not the ultimate solution.

Having provided a relatively readable overview of road building from ancient Roman times to the present, I will now provide some detailed discussion of the prior art

ASPHALT MANUFACTURE

Most road building asphalts are made by distillation of petroleum crude oils usually under vacuum distillation conditions. The asphalt fraction or "bottom of the barrel" is the residual component left after everything readily distillable has been removed. This process has been in use for roughly a century and further discussion thereof is not necessary.

Another source of asphalt is through solvent deasphalting. Such asphalts are generally of a lower quality for road construction but may be used as a blending stock with asphaltic materials obtained by distillation.

SOLVENT DEASPHALTING

Solvent deasphalting is described in U.S. Pat. No. 3,951,781 to Owen (Mobil); U.S. Pat. No. 3,968,023 to Yan (Mobil); U.S. Pat. No. 3,972,807 to Uitti (UOP); U.S. Pat. No. 3,975,396 to Bushnell (Exxon); U.S. Pat. No. 3,981,797 to Kellar (UOP); U.S. Pat. No. 3,998,726 to Bunas (UOP); U.S. Pat. No. 4,017,383 to Beavon (Ralph M. Parsons); U.S. Pat. No. 4,054,512 to Dugan (Exxon); U.S. Pat. No. 4,101,415 to Crowley (Phillips); U.S. Pat. No. 4,125,458 to Bushnell (Exxon); and numerous others. Specific proprietary processes include the SOLVAHL solvent deasphalting process licensed by Institute Francais de Petrole, and the low-energy deasphalting process licensed by Foster Wheeler, U.S.A., shown schematically in FIG. 1. Deasphalting processes also include the ROSE supercritical fluid technology licensed by Kerr-McGee Corporation.

U.S. Pat. No. 4,283,230 to Clementoni, et al. (Exxon) teaches improving the properties of propane-precipitated asphalt by air blowing (and adding 5–60 wt % sulfur-treated petroleum) to make paving grade asphalt.

U.S. Pat. No. 5,601,697 to Miller, et al. teaches SDA-produced asphalts (containing solvent deasphalting bottoms) made by blending SDA bottoms with aromatic extract. The asphalt can contain added polymers which can be vulcanized in situ with the asphalt by using sulfur and accelerators.

SULFUR /POLYMER

Sulfur has been used as a modifier for asphalt, by itself or with polymers, for vulcanization properties. U.S. Pat. No. 123,458 to Crawford discloses bituminous binders comprising asphalt, distilled coal tar, Crawford's redistilled oil and sulfur (2.2 wt %). U.S. Pat. No. 1,163,593 to Forrest describes a refining process for natural asphalts which prevents loss of naturally occurring sulfur found in crude oils which are refined to produce asphalt compositions. Hydrogen sulfide liberation is minimized by utilizing fixed oils to absorb sulfur. U.S. Pat. No. 1,266,261 to Henderson discloses premixing coal tar pitch and 6 to 14% sulfur in volatile petroleum and thereafter driving off the added petroleum. U.S. Pat. No. 1,353,003 to White, et al. describes acid- and alkali-resistant coatings containing coal tar pitch and crystallized sulfur which are prepared at low temperatures in order to prevent reaction of the pitch with sulfur. The sulfur is added to increase viscosity and reduce the melting point of the pitch.

U.S. Pat. No. 2,673,815 teaches use of phosphorus sesquisulfide (P4S3) as a dispersion in oil to improve the adhesion characteristics of asphalt. No polymer was present.

U.S. Pat. No. 3,738,853 to Kopvillem discloses sulfur addition to asphalt at 100% or more of asphalt content to produce an asphalt casting composition. U.S. Pat. No. 3,970,468 to Garrigues, et al. discloses sulfur emulsions in asphalt prepared by dispersion of 15 to 100 parts molten sulfur in 100 parts asphalt under high shear. U.S. Pat. No. 4,154,619 to Pronk describes the use of polysiloxane stabilizer for sulfur dispersed in bitumen. Sulfur is employed at levels of 20% to 50% of the bitumen and organosiloxane at 0.1% or less of bitumen.

U.S. Pat. No. 4,211,575 to Burris discloses a process for producing asphaltic emulsions containing 10% to 50% sulfur in the asphalt phase, utilizing a hydrocarbon solvent for softening. The sulfur is added to bitumen at temperatures below 152° C. (305° F.) to avoid evolving hydrogen sulfide. The composition is emulsified to produce an asphalt emulsion for pothole repair.

U.S. Pat. No. 4,283,230 taught use of sulfur treated oil in asphalt, with the example showing "extract oil, (treated with 4 wt % sulfur at 200–225° C. . . ."

U.S. Pat. No. 4,298,397 to Burris teaches a stockpile asphalt emulsion of 50–98% paving grade asphalt, 1–10% added sulfur, and 1–35% liquid hydrocarbon, added as a softening agent. Sulfur is melted and sulfur and asphalt mixed, then oil is "preferably mixed with the material after the asphalt and sulfur have been combined."

U.S. Pat. No. 4,750,984 to Ott taught preparation of high quality asphalts by adding sulfur into asphalt or oil feedstocks and heating until asphaltenes formed.

U.S. Pat. No. 5,374,672 to Chaverot, et al. discloses a "mother solution" of polymer, oil, and sulfur for asphalt. Canadian Patent No. 764,861 to Pethrick, et al. describes a bituminous composition containing i) propane precipitated asphalt which is sulfrized by the addition of 2 to 20 wt % of sulfur, ii) lube plant extract, and iii) a vacuum residue. The vacuum residue is added to provide higher temperature susceptibility.

U.S. Pat. No. 4,330,449 to Maldonado, et al. mixed polymer with asphalt kept the mixture at 170° C. for 3.5 hours under agitation, and then added 0.1 to 3 wt % sulfur as a cross-linking agent.

The prior art has generally added large amounts of sulfur (greater than 1 wt %) to make asphalts resistant to rutting. However, the addition of such amounts of sulfur can impart undesired brittleness resulting in premature failure of the asphalt in its use, e.g., as road surfaces. Some work has been done on adding low amounts of sulfur. U.S. Pat. No. 5,371,121 to Bellomy, et al. (Chevron) teaches adding 0.015 to 0.075 wt % elemental sulfur to a blend of asphalt and a tri-block copolymer of styrene and butadiene. The elemental sulfur was added after the polymer/asphalt was blended together.

This voluminous amount of prior art should be sunmmarized as follows. Asphalt roads have been constructed for more than a century and a half. Those skilled in these arts have added sulfur, sulfurized oil, polymer and/or rubber, and liquid hydrocarbons for various reasons.

I wanted to develop a safe and effective way to add elemental sulfur to asphalt.

I was also able by careful selection of the sulfur "carrier", a hydrocarbon oil such as 325 neutral oil and mixing conditions (high shear mixing), to form a relatively stable sulfur in oil mixture which did not settle out. The 325 neutral oil also enhanced the properties of the finished asphalt, as taught in my U.S. Pat. No. 5,904,760.

I discovered a simple and safe way to add elemental sulfur to an asphalt fraction, namely forming a slurry of elemental sulfur in a suitable hydrocarbon oil and then adding this slurry to the asphalt.

I avoided the hazardous addition of powdered sulfur, and permitted rapid, uniform, and efficient mixing of the sulir/oil slurry with the asphalt, and avoided the formation of globules of (vulcanized) asphalt.

BRIEF SUMMARY OF THE INVENTION

I. General Statement of the Invention

Accordingly, the present invention provides a method of preparing a mixture of asphalt and sulfur comprising blending together at asphalt blending conditions said asphalt and a sulfur slurry which is essentially free of polymer and comprises solid particles of elemental sulfur in a normally liquid hydrocarbon stream to produce a product blend of asphalt and sulfur slurry.

The present invention also provides a method of preparing a mixture of asphalt, sulfur and liquid hydrocarbon oil comprising forming a sulfur slurry comprising solid sulfur and a liquid hydrocarbon oil to produce a sulfur slurry and mixing said sulfur with a polymer free asphalt, to form a polymer free mixture of solid particles of elemental sulfur, liquid hydrocarbon oil, and asphalt as a product. In another aspect, the invention relates to a pavement composition comprising aggregate and from 1.0% to 10.0% of the asphalt composition prepared by the above method.

DETAILED DESCRIPTION OF PREFERRED EMBODIMENTS

Asphalt Components

The term "asphalt" (sometimes referred to as "bitumen") refers to all types of asphalts (bitumen), including those that occur in nature and those obtained in petroleum processing. The choice will depend essentially on the particular application intended for the resulting bitumen composition. Preferred materials have an initial viscosity at 140° F. (60° C.) of 200 to 6000 poise. The initial penetration range of the base asphalt at 77° F. (25° C.) is 30 to 350 dmm, preferably 50 to 200 dmm, when the intended use of the composition is road paving. Asphalt, which does not contain any polymer, sulfur, etc., may sometimes be referred to herein as a "base asphalt".

Suitable asphalt components include a variety of organic materials, solid or semi-solid, at room temperature, which gradually liquify when heated, and in which the predominate constituents are naturally occurring bitumens, e.g., Trinidad Lake, or residues commonly obtained in petroleum, synthetic petroleum, or shale oil refining, or from coal tar or the like. For example, vacuum tower bottoms produced during the refining of conventional or synthetic petroleum oils are a common residue material useful as asphalt composition. Solvent deasphalting or distillation may produce the asphalt.

Solvent deasphalting (SDA) bottoms may be used as part or all of the asphalt of the product blend. SDA bottoms are obtained from suitable feeds such as vacuum tower bottoms, reduced crude (atmospheric), topped crude, and preferably hydrocarbons comprising an initial boiling point of about 450° C. (850° F.) or above. Preferably the solvent deasphalting bottoms are obtained from vacuum tower bottoms, preferably boiling above 538° C. (1000° F.). Solvent deasphalting can be carried out at temperatures of 93–148° C. (200–300° F.). After solvent deasphalting, the resulting SDA bottoms have a boiling point above 510° C. (950° F.), preferably above 540° C. (1000°F.), and a penetration of 0 to 70 dmm @25° C. (77° F.), preferably 0 to 50 dmm @ 25° C. (77° F.).

Asphalt Cement

The asphalt composition may be solely or partly material produced by distillation, without any solvent extraction step. Such materials, sometimes referred to as "asphalt cement", have a reduced viscosity relative to SDA bottoms. Such asphalt cement component can have a viscosity of 100 to 5000 poises at 60° C. (140° F.), preferably 250 to 4000 poises, e.g., 500 poises for AC5 (PG52-28) asphalt cement. The asphalt cement component is added in amounts sufficient to provide the resulting asphalt composition with the desired viscosity for the intended application, e.g., 2000 poises at 60° C. (140° F.) for paving applications. For Performance Graded (PG) Applications, the asphalt compositions will have a G*/sin delta value in excess of 1.0 kPa at temperatures ranging from 46 to 82° C., preferably 52 to 76° C. Generally, the asphalt compositions of the present invention may contain from 0 to 100 wt %, preferably from 0 to 90 wt %, e.g., 5 to 95 wt %, of such asphalt cement component. The asphalt cement component of reduced viscosity can be obtained from any suitable source, e.g., atmospheric distillation bottoms.

Fluxing Components

Fluxing components may be added to improve the flow properties of the asphalt composition and improve the penetration for a desired softening point. Such fluxing components can include paraffinic as well as aromatic materials, e.g., gas oils (which can contain both isoparaffins and monoaromatics). Gas oils include neutral oils, including hydrotreated, hydrocracked, or isodewaxed neutral oils. Suitable paraffinic fluxing components include paraffinic oils having at least 50 wt % paraffins content (isoparaffins and normal paraffins) such as footes oil (which is highly paraffinic and obtained from deoiling slack wax), as well as slack wax itself. Poly(alphaolefins) (PAOs) are also suited for use as fluxing components. Aromatic oils such as lube plant extract may also be used, but are not preferred due to the high aromatic content.

The primary constraints on the fluxing components are safety and compatibility. The material should be relatively non-volatile, i.e., have initial boiling points above 600° F. The oil should also be chosen so as to minimize health effects. There is no upper limit, per se, on boiling point, and many suitable oils will have end points in the 1000+° F. range. The material preferably has a viscosity similar to that of neutral oils, or higher. Higher viscosity helps keep the sulfur particles in suspension and much, or all, of the flux oil is preferably added to the asphalt with the sulfur slurry, reviewed after the Table of suitable flux oils.

The following Table gives the properties of suitable liquid hydrocarbon oils for use in forming the sulfur slurry.

TABLE

FLUXING AGENTS

| % OFF | 325 HF NEUTRAL | 100 HF NEUTRAL | 325 AROMATIC EXTRACT | ENPROTECT 180N | TEXACO HVGO 61205 | TEXACO 93010 AE BTMS |
|---|---|---|---|---|---|---|
| IBP | 653 | 607 | 647 | 450 | 494 | 474 |
| 1% | 682 | 629 | 670 | 554 | 564 | 577 |
| 5% | 749 | 668 | 737 | 690 | 667 | 718 |
| 10% | 782 | 687 | 771 | 724 | 698 | 757 |
| 15% | 802 | 700 | 792 | 744 | 716 | 783 |
| 20% | 817 | 710 | 807 | 760 | 730 | 803 |
| 25% | 829 | 721 | 819 | 774 | 743 | 820 |
| 30% | 840 | 730 | 830 | 786 | 755 | 836 |
| 35% | 850 | 739 | 840 | 797 | 766 | 851 |
| 40% | 859 | 748 | 850 | 808 | 776 | 864 |
| 45% | 868 | 757 | 859 | 818 | 787 | 878 |
| 50% | 877 | 766 | 868 | 829 | 797 | 891 |
| 55% | 885 | 776 | 877 | 840 | 807 | 904 |
| 60% | 894 | 785 | 886 | 851 | 818 | 917 |
| 65% | 902 | 796 | 895 | 862 | 829 | 930 |
| 70% | 911 | 807 | 905 | 875 | 842 | 943 |
| 75% | 921 | 819 | 915 | 888 | 855 | 958 |
| 80% | 931 | 833 | 925 | 901 | 871 | 974 |
| 85% | 942 | 850 | 937 | 916 | 889 | 990 |
| 90% | 955 | 873 | 952 | 934 | 912 | 1015 |
| 95% | 974 | 907 | 973 | 959 | 946 | 1063 |
| FBP | 1028 | 986 | 1033 | 1015 | 1030 | 1151 |

Sulfur

Many blenders will add sufficient sulfur to incorporate into the final blend asphalt product from 0.01 to 1.0 wt % sulfur, preferably 0.025 to 0.5 wt % sulfur, e.g., and more preferably 0.05 to 0.2 wt %. Blenders wanting or needing higher sulfur contents may add sufficient sulfur slurry to produce finished asphalt blends with 1, 2, 3, 4, 5, 6, 7, 8, 9 or 10 wt % sulfur, or even more.

There is no "lower limit" on sulfur concentration in the sulfur slurry, other than one set by economics of using such a dilute sulfur "solution." The upper limit on sulfur concentration is set by pumpability and to some extent by the nature of the flux oil used to form the sulfur slurry. In practice, a 50/50 (by weight) blend works well and makes it easy for operators to calculate how much sulfur slurry is needed, e.g., specify 0.2 wt % slurry addition to add 0.1 wt % sulfur to the final blended asphalt product.

If desired, additives such as surfactants, thickeners, stabilizers, emulsifiers, etc. may be added. A source of sulfur slurries is the Harwick Chemical Manufacturing Company, a subsidiary of the M. A. Hanna Company.

The reactive sulfur compound used in the present invention is preferably elemental sulfur, preferably in a finely ground or divided form. Sulfur is a well-known additive for asphalt and may be added in conventional amounts. What is different is the way the sulfur is added, not the amount. Those wishing to add very small amounts of sulfur to the asphalt may do so by adding small amounts of sulfur/oil slurry. Those wishing to add large amounts of sulfur may do so by adding a larger amounts of sulfur/oil slurry, or increasing the sulfur concentration in the sulfur/oil slurry.

Flux Oil+Sulfur

Preferably, all, or at least a portion of the total amount of, flux oil destined for addition to the asphalt product is added with the sulfur slurry. This means that some, or all, of the flux oil which would be added to the asphalt product is slurried with sulfur and the resulting slurry of sulfur in liquid hydrocarbon is added to the (asphalt+polymer) blend.

The use of neutral oil and high shear mixing of sulfur is preferred for forming a relatively stable slurry of sulfur and oil. Use of 325HF neutral oil is more preferred, both as a good carrier for the sulfur and to improve the low temperature performance properties of the finished product.

The sulfur may comprise from 0.1 to 80 wt % of the slurry, with the balance being the liquid oil. Preferably the sulfur slurry has a sulfur content of 10 to 60 wt %, with the balance being liquid oil.

A suitable high shear mixing device is a Should, Reichel-Drews, or Cowels type disperser for Kettle type dispersion mixtures. Ross, Siefer or Dalworth high shear inline mills may also be used for larger production batches. Slurries may also be produced using conventional ball type mills commonly used for pigment dispersion manufacture in the paint and coatings industry.

The sulfur slurry may be formed by mixing dry powdered sulfur, having a small average particle size, with the hydrocarbon oil and mixing for 10–240 minutes at 70–250° temperature. There is nothing novel about adding finely ground sulfur to asphalt; this has been practiced for decades and detailed discussion is not necessary for those skilled in the asphalt arts. Ground sulfur is a staple article of commerce, with extensive use in rubber making and as a pesticide.

Other Sulfur Sources

While finely ground elemental sulfur slurry is the preferred source of sulfur cross-linking agent, it is also possible to use other hydrocarbon based sulfur sources, though not necessarily with equivalent results. Sulfurized oils, disulfide oils, and other hydrocarbon streams containing naturally occurring sulfur compounds may also be used though generally somewhat larger amounts of sulfur will be required.

While use of chemically bound, hydrocarbon phase, sulfur cross-linking agent is not as efficient in terms of total sulfur usage required, the hydrocarbon liquid phase sulfur does avoid localized high concentrations of sulfur which will occur when powdered sulfur is added.

Polymer Additives

It is the intent of the process of the present invention to provide a way to achieve the benefits of sulfur addition to asphalt mixtures which are essentially free of polymer, rubber additives and the like.

Blending

Conventional conditions may be used to blend the base bitumen (or base asphalt) with the sulfur slurry.

High shear mixing is a preferred blending method, using a device such as a Reichel-Drews Polymer Unit equipped with a super high shear mill, operating for 10 to 240 minutes at a temperature of 200 to 400° F.

Other conventional mixing techniques may be used—use of blades or impellers to stir a tank of the material, use of low efficiency pumps to transfer the material from vessel to another, use of static mixers, and the like.

Sulfur Treatment

The conditions for treatment with elemental sulfur comprise temperatures of 100 to 300° C. (220 to 572° F.), preferably 110 to 250° C. (230 to 482° F.) a time from 1 or 2 minutes to 5 to 10 hours, preferably 0.1 to 4 hours, e.g., 0.5 to 2 hours. In practice, the blending of asphalt+sulfur slurry will usually occur at a temperature above the melting point of sulfur, so the sulfur treating reaction proceeds quickly. In practice, much of the sulfur treating will take place in trucks delivering hot product.

Ranges of Materials Used

Suitable ranges of materials include:

|  | Broad | Preferred | Most Preferred |
| --- | --- | --- | --- |
| Asphalt Cement | 80.0 to 99.98% | 80.0 to 99.9% | 90.0 to 98.0% |
| 325HF Neutral Oil | 0.01 to 10.0% | 0.05 to 15.0% | 1.0% to 10.0% |
| Sulfur | 0.01 to 10.0% | 0.05 to 5.0% | 0.05 to 0.5% |

The sulfur and 325HF neutral oil slurry blend is pre-dispersed at high shear with or without the use of dispersants or surfactants. The mixture is injected into the asphalt preferably with mixing. The asphalt-sulfur slurry mixture is preferably reacted at temperatures of 200–500° F. Other oils may be used, such as aromatic extracts, bright stocks, or other mineral lubricating base oils, but the neutral oils are preferred.

For clarity, I emphasize that much of the blending process is conventional and forms no part of the present invention. The starting asphalt (or bitumen) materials are well known, as is the addition of sulfur and of flux oil to improve low temperature properties. My invention is not, per se, the amount of sulfur or flux oil added to the asphalt—all amounts added can be conventional.

What is different in my approach is forming a slurry of (sulfur+flux oil) and mixing the sulfur slurry into the asphalt with both the asphalt and the slurry being essentially free of polymer.

The present invention is useful for, e.g., the production of valuable high-specification asphalts having increased resistance to rutting at high temperatures (46 to 82° C.), as outlined in the Performance Based PG Specifications contained in AASHTO MP-1.

Details of SHRP specifications may be taken from FIG. 6 of U.S. Pat. No. 5,728,291.

A simplified process flow diagram for vacuum tower processing of crude oil to produce an asphalt fraction is shown in FIG. 2 of U.S. Pat. No. 5,728,291.

The following examples represent actual experimental work. In some cases the directions may seem "hypothetical" as when mild agitation is performed for "a period of 2 to 24 hours". These were, however, the actual instructions. The operator was given considerable flexibility to perform non-critical steps, and products would be mixed for 2 hours, and shipped within 24 hours.

EXAMPLES

Example 1

(Comparative)

Into a high shear mixing device is charged 95.25 parts of asphalt cement and agitation started. Slowly added is 4.75 parts of an SBS copolymer and allowed to pre-wet at a temperature of 325–340° F. for a period of 10 to 30 minutes. Circulation is initiated through a high shear mixer until SBS polymer is completely dispersed into the asphalt phase. Finished blend is then pumped to a separate storage tank and held under mild agitation at 325–340° F. for a period of 2 to 24 hours. Material is sampled and tested for conformance to Performance Graded asphalt specifications and found to have an actual PG grade of PG80.6-20.5, meeting requirements of PG76-16. Separation tests for compatibility and stability performed on this material typically have separation differences of 35–50 degrees.

Example 2

(Invention)

Into a high shear mixing device is charged 95.25 parts of asphalt cement under agitation. Slowly added is 4.75 parts of an SBS copolymer and allowed to prewet at a temperature of 325–340° F. for a period of 10–30 minutes. Circulation is initiated through a high shear mixer until SBS polymer is completely dispersed into the asphalt phase. Finished blend is then pumped to a separate storage tank and held under mild agitation at 325–340° F. for a period of 2 to 24 hours.

In a separate mixing device, elemental sulfur is added to a mineral lubricating base stock in equal parts of 50 percent sulfur and 50 percent oil. This mixture is subjected to a high shear mixing device with prepares a fine dispersion of sulfur in the oil phase. Once this dispersion is prepared, 0.2 parts of said dispersion is added slowly by injection into the tank under agitation and allowed to react with the asphalt polymer mix for 2 to 24 hours at temperatures of 325–340° F. Material is then sampled and evaluated for Performance Graded asphalt specification compliance and found to have an actual grade of PG80.1-26.2, meeting requirements of PG76-22, a completed low temperature grade improvement. Storage stability separation testing is completed and separation differences are found to be less than 4° C.

Example 3

(Invention)

To a conventional mixing kettle is added 91 parts of an asphalt cement having a PG grade of PG64-22. Under mild agitation at temperatures of 325–340° F. is added 9 parts of an SBS copolymer which is then allowed to mix into the liquid asphalt. Circulation is initiated through a high shear mixing device to completely disperse the polymer into a fine dispersion in the asphalt cement. This concentrate is then shipped to a satellite facility where it is then diluted 50 parts with an asphalt cement having a PG grade of PG64-22 and is further diluted 50 parts with an asphalt binder having a PG grade of PG52-28. This blend is then allowed to mix under agitation at temperatures of 325–340° F. for a period of 2 to 24 hours.

In a separate mixing device, elemental sulfur is added to a mineral lubricating base stock in equal parts of 50 percent sulfur and 50 percent oil. This mixture is subjected to a high shear mixing device with prepares a fine dispersion of sulfur in the oil phase. Once this dispersion is prepared, 0.2 parts of said dispersion is added slowly by injection into the polymer/asphalt mixture under agitation and allowed to react with the asphalt polymer mix for 2 to 24 hours at temperatures of 325–340° F. Material is then sampled and evaluated for Performance Graded asphalt specification and found to have an actual grade of PG66.2-29.8, meeting the requirements of PG64-28. Storage stability separation testing is conducted on the finished blend and found to have a separation difference of less than 4° C.

Example 4

(Comparative)

Into a conventional mixing kettle is charged 96.8 parts of an asphalt cement binder meeting PG64-22 requirements. Into this liquid is added slowly under mild agitation 3.0 parts of an SBS copolymer and allowed to mix at temperatures of 325–340° F. This mixture is then circulated through a high shear mill until the polymer is uniformly dispersed into the liquid asphalt cement. The mixture is then pumped to a storage tank and held under mild agitation for a period of 2 to 24 hours. Approximately 0.1 parts of elemental sulfur is bagged into 5 lb. packages using low density polyethylene plastic bags which are then dropped into the top of the tank in sequence slowly over a period of 5 to 30 minutes and allowed to react under mild mixing at 325–340° F. for a period of 2 to 24 hours. Material is then sampled and evaluated for Performance Graded asphalt specification conformance and found to meet an actual grade of PG75.6-26.5, meeting requirements for PG70-22. However, when the tank was empty and opened for inspection, large globules of over-cross-linked polymerized asphalt were found which were non-soluble in the liquid asphalt and remained dispersed as contamination throughout the batch and upon filtering.

Example 5

(Comparative)

Into a conventional mixing kettle is charged 96.8 parts of an asphalt cement binder meeting PG64-22 requirements. Into this liquid is added slowly under mild agitation 3.0 parts of an SBS copolymer and allowed to mix at temperatures of 325–340° F. This mixture is then circulated through a high shear mill until the polymer is uniformly dispersed into the liquid asphalt cement The mixture is then pumped to a storage tank and held under mild agitation for a period of 2 to 24 hours. The material is sampled for conformance to Performance Graded asphalt binder specifications and found to meet an actual grade of PG73.2-22.7, meeting requirements for a PG70-22. Borderline low temperature results were obtained as well as a 3 degree inferior high temperature grading without the use of sulfur.

Example 6

(Comparative)

To a conventional mixing kettle is charged 97.0 parts of an asphalt binder meeting the requirements of PG58-28. Under mild agitation at temperatures of 325–340° F. is slowly added 3.0 parts of an SBS copolymer. After mixing for 10 to 60 minutes, this mixture is circulated through a high shear mixer until the polymer is completely dispersed uniformly into the liquid asphalt. This material is then pumped to a storage tank and held under mild agitation for a period of 2 to 24 hours. The material is then sampled and evaluated for conformance to Performance Graded asphalt binder specifications conformance and found to meet an actual grading of PG65.5-28.3, meeting the requirements for a PG64-28. The material, without the use of sulfur and oil dispersion of Example 3, just barely met the PG64-28 low temperature requirements. The separation testing on this material was found to have a difference of greater than 10 degrees.

The Examples above show that a safe sulfur slurry can be used to safely and efficiently add finely divided elemental sulfur to asphalt. The Examples are identical to those in my closely related case, 6318AUS, filed simultaneously with this case. 6318AUS claimed blending polymer with asphalt and then adding sulfur in oil.

This work gave me the idea of a new, and safer, way of adding sulfur to asphalt, even when there was no polymer present.

Discussion

While I do not wish to be bound by any theory as to why the invention works, my belief is as follows.

The sulfur treating reaction occurs relatively rapidly, as soon as sulfur slurry is added. Indeed the extreme rapidity of cross-linkng, caused by high localized concentrations of sulfur when dumping large amounts of sulfur powder into the asphalt, is the reason I add sulfur as a readily dispersible slurry. My sulfur slurry approach to sulfur addition greatly reduces, or eliminates, formation of incompatible, over-treated asphalt phases which can settle in the bottom of the hot mix tank or cause filtration problems.

I am not sure exactly why the sulfur slurry process works so well as a method of sulfur addition. The mechanism for its success may be as simple as that experienced by cooks forming flour gravies. A flour-in-water slurry mix provides an easy and reliable way of incorporating a thickening agent into a pot. Sprinling dry flour into the same pot frequently results in formation of lumps. It is a simple process which improves safety, and has never been used to form a polymer free asphalt, so far as is known.

Modifications

Specific compositions, methods, or embodiments discussed are intended to be only illustrative of the invention disclosed by this specification. Variations on these compositions, methods, or embodiments are readily apparent to a person of skill in the art based upon the teachings of this specification and are, therefore, intended to be included as part of the invention disclosed herein.

Reference to documents made in the specification is intended to result in such patents or literature being expressly incorporated herein by reference, including any patents or other literature references cited within such documents.

What is claimed is:

1. A method of preparing a mixture of asphalt and sulfur, which mixture is essentially free of polymer, comprising blending together at asphalt blending conditions said asphalt and a sulfur slurry of particles of elemental sulfur in a normally liquid hydrocarbon stream to produce a product blend of asphalt and sulfur slurry.

2. The method of claim 1 wherein said sulfur slurry is added in an amount sufficient to incorporate 0.01 to 5.0 wt % sulfur in said product blend.

3. The method of claim 1 wherein said sulfur slurry is added in an amount sufficient to incorporate 0.05 to 1.0 wt % sulfur in said product blend.

4. The method of claim 1 wherein said sulfur is a powdered or finely granulated form of elemental sulfur which forms an explosive mixture in air and a flammable, but not explosive, sulfur slurry, in said liquid hydrocarbon.

5. The method of claim 1 wherein said asphalt comprises a residue fraction obtained by distillation or vacuum distillation of crude oil.

6. The method of claim 1 wherein said asphalt comprises an asphaltic fraction obtained from a solvent deasphalting unit.

7. The method of claim 1 wherein said liquid hydrocarbon oil is a flux oil having a Cleveland Open Cup (COC) Flash Point above 300° F. and a viscosity from 35 SSU at 100° F. to 13000 SSU at 100 ° F.

8. The method of claim 1 wherein said liquid hydrocarbon oil comprises from 1 to 35 wt % of said product blend.

9. The method of claim 1 wherein said sulfur slurry comprises from 1 to 75 wt % sulfur and sufficient flux oil to maintain said slurry as a pumpable blend.

10. The method of claim 1 wherein said sulfur is in the form of a finely divided powder.

11. An asphalt blend prepared by the method of claim 1.

12. A pavement composition comprising aggregate and from 1.0% to 10.0% of asphalt blend prepared by the method of claim 1.

13. A method of preparing a mixture of asphalt, sulfur and liquid hydrocarbon oil comprising forming a polymer free sulfur slurry comprising solid sulfur and a liquid hydrocarbon oil to produce a sulfur slurry and mixing said sulfur with a polymer free asphalt, to form a polymer free mixture of solid particles of elemental sulfur, liquid hydrocarbon oil, and asphalt as a product.

* * * * *